(12) United States Patent
Kageyama

(10) Patent No.: US 7,127,283 B2
(45) Date of Patent: Oct. 24, 2006

(54) CONTROL APPARATUS USING BRAIN WAVE SIGNAL

(75) Inventor: Tatsumi Kageyama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 20 days.

(21) Appl. No.: 10/691,607

(22) Filed: Oct. 24, 2003

(65) Prior Publication Data

US 2004/0097824 A1    May 20, 2004

(30) Foreign Application Priority Data

Oct. 30, 2002    (JP) ............... 2002-316394

(51) Int. Cl.
*A61B 5/04*    (2006.01)
(52) U.S. Cl. ...................... 600/544; 600/545
(58) Field of Classification Search ............... 600/544, 600/545
See application file for complete search history.

(56) References Cited

U.S. PATENT DOCUMENTS

| | | | | |
|---|---|---|---|---|
| 4,949,726 | A * | 8/1990 | Hartzell et al. | 600/544 |
| 5,729,205 | A * | 3/1998 | Kwon | 340/573.1 |
| 6,254,536 | B1 * | 7/2001 | DeVito | 600/300 |
| 6,349,231 | B1 * | 2/2002 | Musha | 600/544 |
| 6,636,763 | B1 * | 10/2003 | Junker et al. | 600/545 |
| 6,829,502 | B1 * | 12/2004 | Hong et al. | 600/544 |
| 2003/0176806 | A1 * | 9/2003 | Pineda et al. | 600/544 |

FOREIGN PATENT DOCUMENTS

| | | |
|---|---|---|
| CN | 2075064 U | 4/1991 |
| JP | 4-250171 A | 9/1992 |
| JP | 7-79937 A | 3/1995 |
| JP | 7-182595 A | 7/1995 |
| JP | 2001-30886 A | 2/2001 |

OTHER PUBLICATIONS

Tagaito, Unisys Technology Review, vol. 19, No. 64, 2000, pp. 103-114.

* cited by examiner

*Primary Examiner*—Charles A. Marmor, II
*Assistant Examiner*—Navin Natnithithadha
(74) *Attorney, Agent, or Firm*—Birch, Stewart, Kolasch & Birch, LLP

(57) ABSTRACT

A control apparatus includes an arithmetic unit for generating a brain wave pattern based on a brain wave signal obtained from a driver's head, for comparing the generated brain wave pattern with a plurality of brain wave patterns pre-stored in a control processing unit, when there is a match between the generated brain wave pattern and one of the plurality of brain wave patterns pre-stored in the control processing unit, for identifying an operation description associated with the one of the plurality of brain wave patterns, and for reading corresponding control data so as to generate and deliver a corresponding control signal that causes a vehicle-mounted apparatus to carry out an operation specified by the associated operation description to the vehicle-mounted apparatus based on the control data.

9 Claims, 9 Drawing Sheets

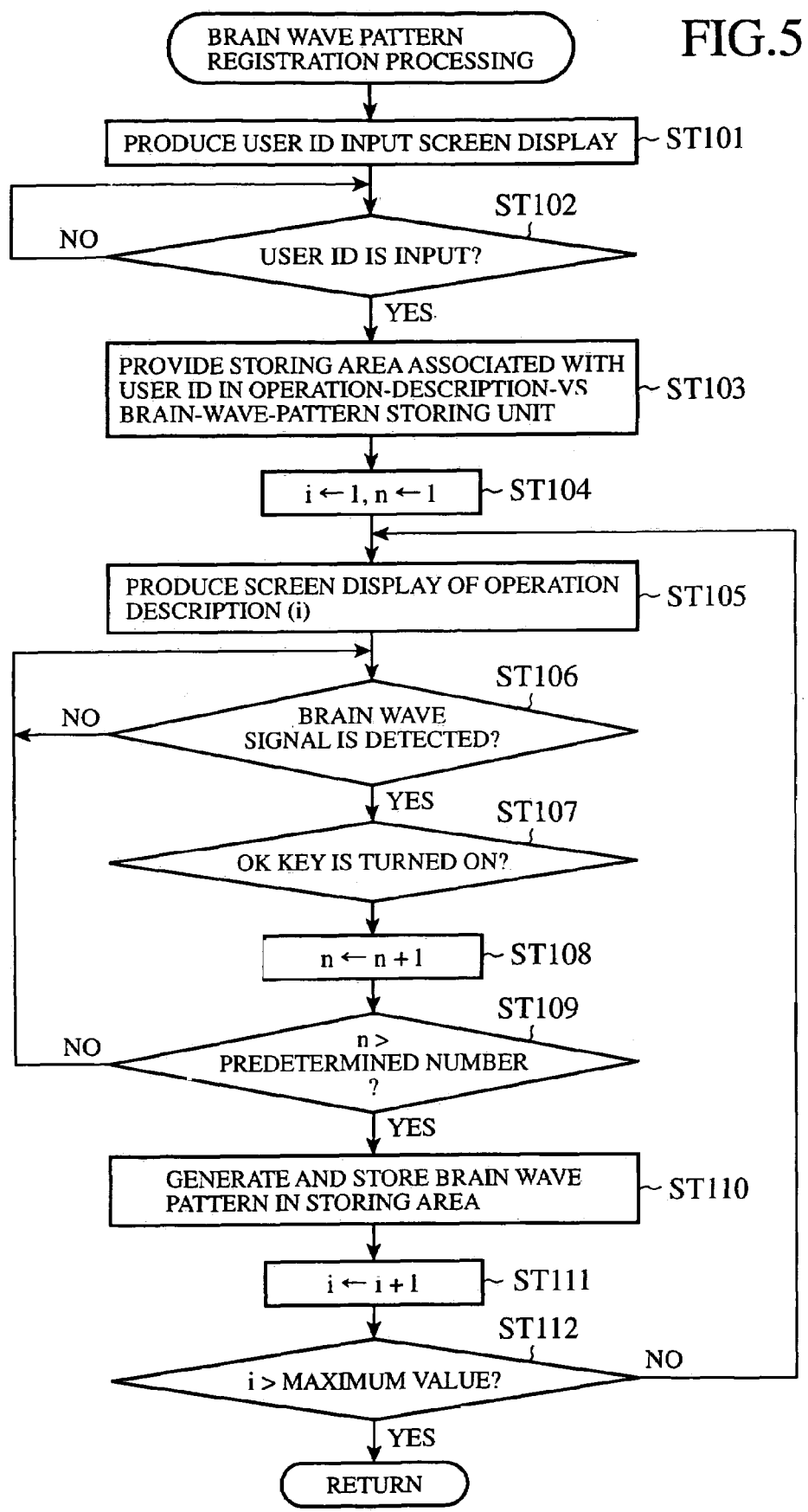

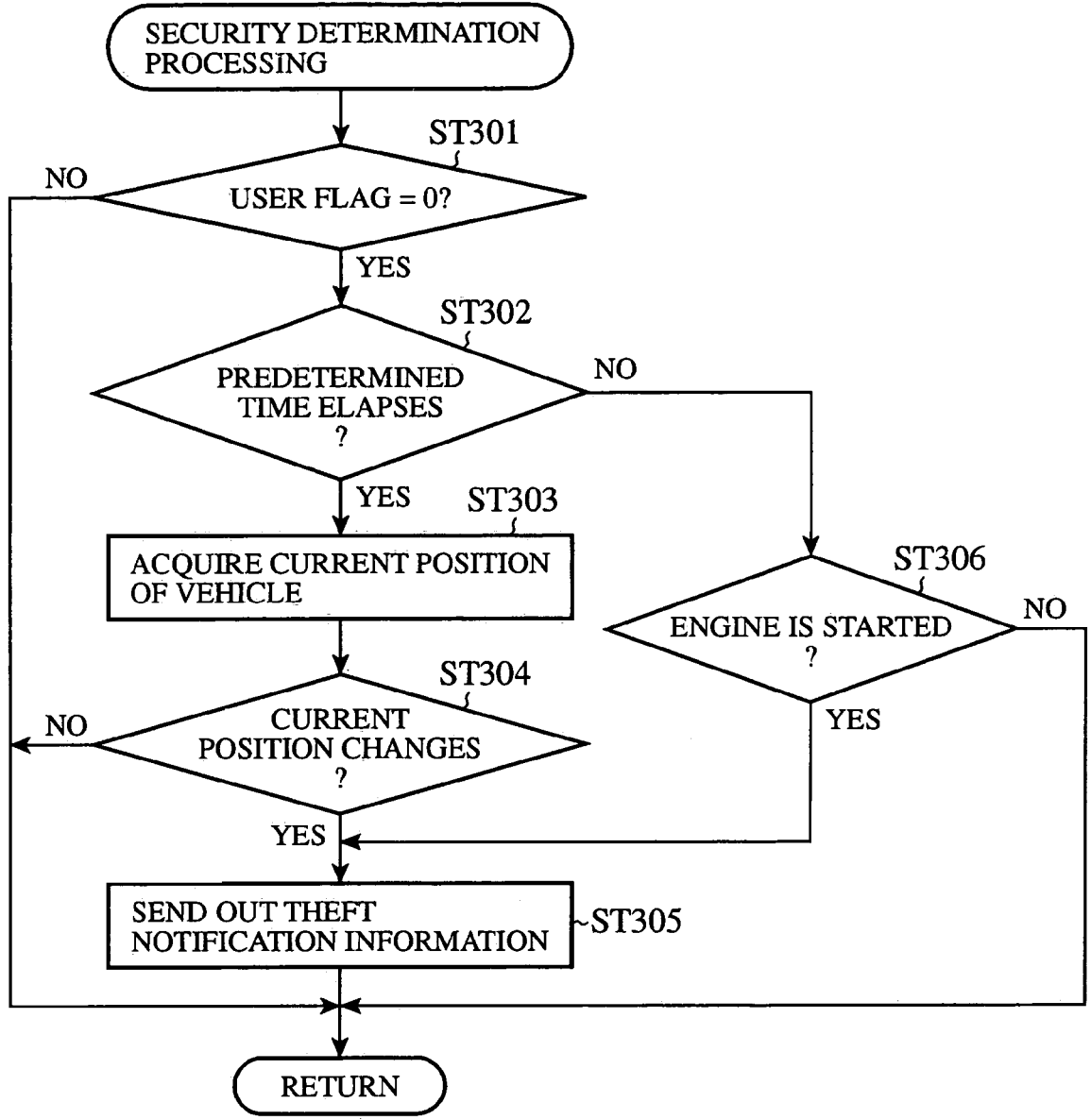

CONTROL APPARATUS USING BRAIN WAVE SIGNAL

This nonprovisional application claims priority under 35 U.S.C. § 119(a) on Patent Application No. 2002-316394 filed in JAPAN on Oct. 30, 2002, which is herein incorporated by reference.

BACKGROUND OF THE INVENTION

1. Field of the Invention

The present invention relates to a control apparatus for controlling an apparatus to be controlled by using a brain wave signal.

2. Description of Related Art

Such control apparatuses include a navigation apparatus for guiding a moving object, such as a vehicle or ship, so that the moving object can travel by way of an optimum route. A prior art navigation apparatus using a brain wave signal has been proposed. For example, there has been provided a prior art navigation apparatus equipped with a dangerous operation notification function, which can expect the occurrence of a danger before the driver carries out a dangerous operation of a vehicle and which can inform the user that a danger will occur, thereby improving the driving safety.

The prior art navigation apparatus, which determines the current position of the vehicle based on a GPS signal by using a GPS antenna unit and which reads map information stored in a CD-ROM by using a CD access unit based on this current position and displays the map information on a display unit thereof, grasps information about roads to which the vehicle will be able to be headed in advance by using a road detecting unit after the CD access unit has acquired the map information about a map of an area with center at the current position acquired by the GPS antenna unit. A safety evaluating unit estimates what the user will do from the user's brain wave acquired by a brain wave detecting unit and further estimates a road along which the user will drive the vehicle so as to evaluate the safety of the road. As a result, when the safety evaluating unit evaluates that the driver's predicted action is dangerous, a notification unit notifies the danger of the action to the driver (for example, refer to Japanese patent application publication (TOKKAIHEI) No. 7-182595 (see paragraph numbers "0007", "0008", and "0009")).

Although the prior art navigation apparatus can notify the safety of the road along which the driver will drive the vehicle to the driver by estimating the driver's future action by using a detected brain wave signal, the prior art navigation apparatus cannot positively control the navigation apparatus itself and a vehicle-mounted apparatus by using the detected brain wave signal. In addition, the prior art navigation apparatus does not implement a security function of notifying a theft of the vehicle to users by using a brain wave signal.

SUMMARY OF THE INVENTION

The present invention is proposed to solve the above-mentioned problems, and it is therefore an object of the present invention to provide a control apparatus that can control various apparatuses that are targets to be controlled by using a brain wave signal.

It is a further object of the present invention to provide a control apparatus that can implement a security function of automatically notifying a theft of a vehicle to users by using a brain wave signal.

In accordance with an aspect of the present invention, there is provided a control apparatus using a brain wave signal, the apparatus including a first storing unit for pre-storing descriptions (referred to as operation descriptions from here on) of a plurality of types of operations, each of which is to be performed on an apparatus to be controlled, and a plurality of brain wave patterns being respectively associated with the plurality of operations descriptions, a second storing unit for pre-storing a plurality of control data each of which is used for causing an apparatus to be controlled carry out an operation specified by a corresponding operation description, a brain wave detecting unit for detecting a brain wave signal from a user's head, a brain wave pattern generating unit for generating a brain wave pattern based on the brain wave signal detected by the brain wave detecting unit, a brain wave pattern comparison unit for comparing the brain wave pattern generated by the brain wave pattern generating unit with the plurality of brain wave patterns stored in the first storing unit, and for, when there exists a brain wave pattern substantially matching the generated brain wave pattern in the first storing unit, identifying an operation description associated with this brain wave pattern substantially matching the generated brain wave pattern, and a signal processing unit for reading control data corresponding to the identified operation description from the second storing unit so as to generate a control signal causing an apparatus to be controlled carry out an operation specified by the identified operation description. The control apparatus can thus control any other various objects to be controlled by using a brain wave signal.

In accordance with another aspect of the present invention, there is provided a control apparatus using a brain wave signal, the apparatus including a brain wave detecting unit for detecting a brain wave from a user's head so as to generate a brain wave signal, a moving object information detecting unit for detecting a change of a status of a moving object, and a security determination unit for sending out an electric wave indicating a notification that the moving object has been stolen when the moving object information detecting unit detects a change of the status of the moving object while the brain wave detecting unit does not detect any brain wave. The control apparatus can thus implement a security function of automatically notifying a theft of such a moving object as a vehicle or ship to users by using a brain wave signal.

Further objects and advantages of the present invention will be apparent from the following description of the preferred embodiments of the invention as illustrated in the accompanying drawings.

BRIEF DESCRIPTION OF THE DRAWINGS

FIG. 5 is a flow chart showing brain wave registration processing of step ST3 shown in FIG. 4;

FIG. 11 is a flow chart showing security determination processing of step ST214 shown in FIG. 10.

DETAILED DESCRIPTION OF THE PREFERRED EMBODIMENTS

In general, human being's brain waves have a frequency band ranging from 0 Hz to a few hundreds of Hz. In accordance with "An evaluation of user interface with emotions," (UNISYS TECHNOLOGY REVIEW No. 64, February 2000) by Mr. Hirokazu Tagaito, brain waves can be measured as a theta wave of 5 to 8 Hz, an alpha wave of 8 to 13 Hz, and a beta wave of 13 to 20 Hz by using an emotion spectrum analysis method. This emotion spectrum analysis method includes the steps of bringing 10 electrodes into contact with a human being's head, detecting a potential that appears between one pair of two arbitrary ones of the 10 electrodes as a brain wave signal, and amplifying the brain wave signal so as to measure the human being's brain wave.

Therefore, there are 45 possible pairs of two electrodes that can be selected from the 10 electrodes. When theta, alpha, and beta brain wave signals of three frequency bands are measured for each of the 45 possible pairs of two electrodes, 135 correlation coefficients in total are acquired. By then extracting features concerning "anger/stress", "joy", "sadness", and "relaxation" that are human emotional elements, 540 correlation coefficients are determined for analysis of brain waves.

Hereafter, navigation apparatuses intended for vehicles and using brain wave signals in accordance with embodiments 1 and 2 will be explained based on the above-mentioned research paper and well-known other studies of brain waves.

Embodiment 1.

Figure 1:
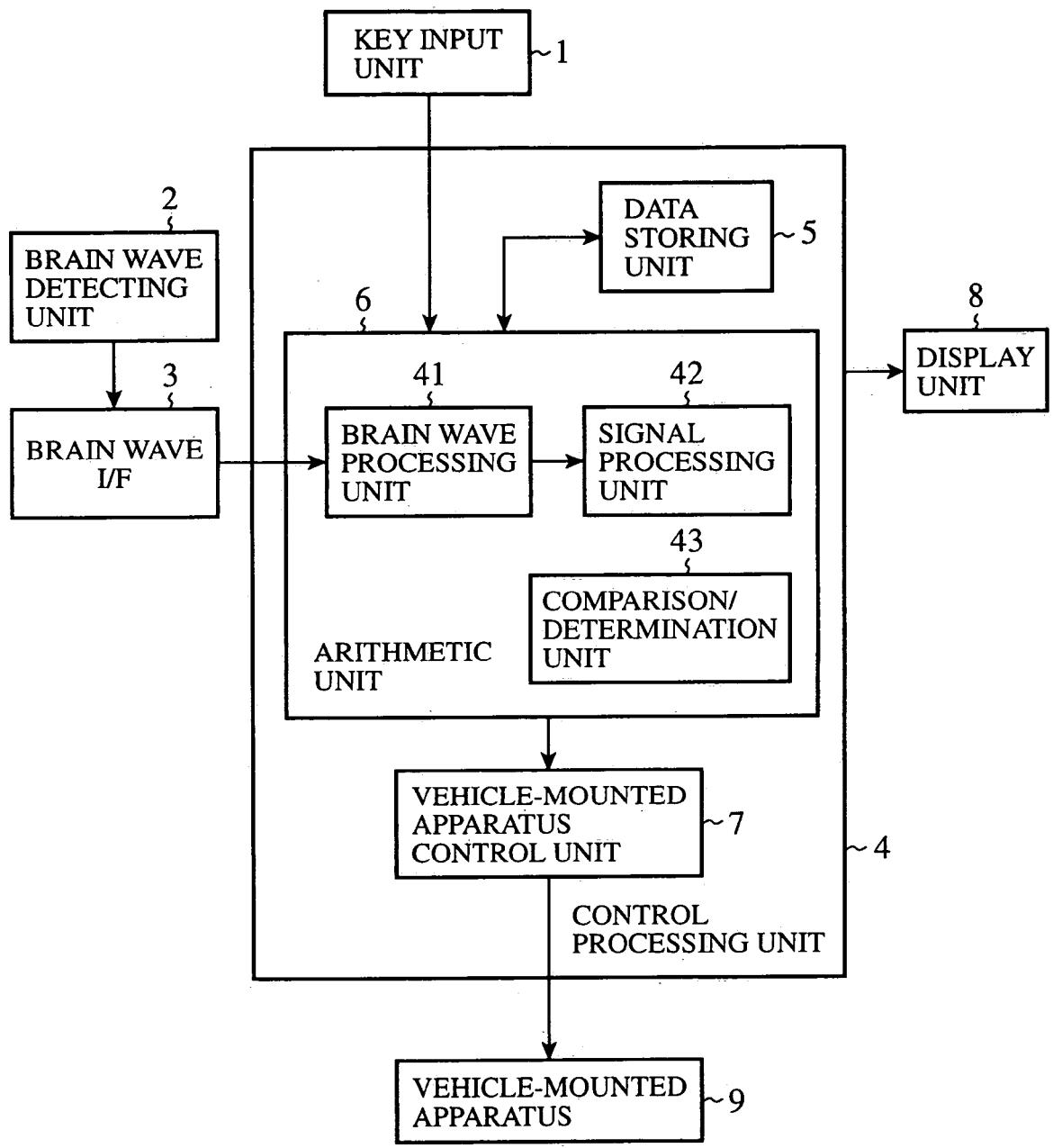
FIG. 1 is a block diagram showing the system configuration of a control apparatus intended for vehicles and using a brain wave signal in accordance with embodiment 1 of the present invention.

FIG. 1 is a block diagram showing the system configuration of a control apparatus intended for vehicles and using a brain wave signal in accordance with embodiment 1 of the present invention. In this figure, a key input unit 1 receives an instruction input by a user according to the user's operation. A brain wave detecting unit (i.e., a brain wave detecting means) 2 detects a brain wave from a plurality of electrodes attached to a driver's head and generates and sends out a brain wave (or EEG) signal. A brain wave interface unit 3 carries out signal processing, such as amplification and level adjustment, on the brain wave signal delivered from the brain wave detecting unit 2, and delivers the processed brain wave signal to a control processing unit 4. The control processing unit 4 carries out a variety of control processes based on the brain wave signal delivered thereto from the brain wave interface unit 3.

The control processing unit 4 is comprised of a data storage unit 5, an arithmetic unit 6, and a vehicle-mounted apparatus control unit 7. A display unit 8 and a vehicle-mounted apparatus 9 are connected with this control processing unit 4. The display unit 8 produces a screen display based on image data delivered thereto by the control processing unit 4. The vehicle-mounted apparatus 9 (i.e., a target apparatus to be controlled) can be comprised of various apparatuses that are respectively controlled by control signals from the control processing unit 4. The data storage unit (i.e., a second storing means) 5 stores control data associated with the descriptions of various operations each of which is to be performed on the vehicle-mounted apparatus 9 in order to control the vehicle-mounted apparatus 9. The arithmetic unit 6 carries out arithmetic processing based on the brain wave signal delivered thereto from the brain wave interface unit 3. The vehicle-mounted apparatus control unit 7 sends out a control signal used for driving the vehicle-mounted apparatus 9.

The arithmetic unit 6 is comprised of a brain wave processing unit 41, a signal processing unit 42, and a comparison/determination unit 43. The brain wave processing unit 41 processes the brain wave signal delivered thereto from the brain wave interface unit 3. The signal processing unit 42 (i.e., a signal processing means) carries out signal processing based on data acquired from the brain wave processing unit 41. The collation determination unit 43 compares data acquired from the signal processing unit 42 with a plurality of data stored in the data storage unit 5.

Figure 2:
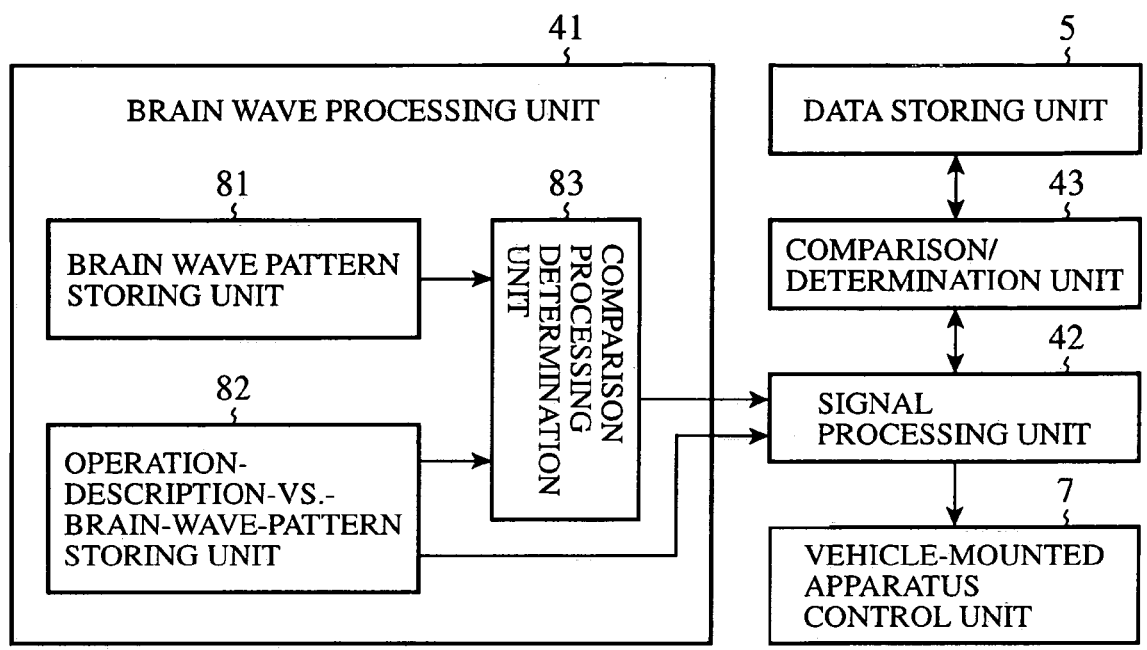
FIG. 2 is a block diagram showing the internal structure of a brain wave processing unit of the control apparatus in accordance with embodiment 1 of the present invention.

FIG. 2 is a block diagram showing the internal structure of the brain wave processing unit 41 and a relationship between the brain wave processing unit 41 and the signal processing unit 42, the comparison/determination unit 43, the data storing unit 5, and the vehicle-mounted apparatus control unit 7. As shown in this figure, the brain wave processing unit 41 is comprised of a brain-wave pattern storing unit 81, an operation-description-vs.-brain-wave-pattern storing unit 82, and a comparison processing unit 83. The brain wave pattern storing unit (i.e., a brain wave pattern generating means) 81 produces a brain wave pattern based on a brain wave signal, which is generated by the brain wave detecting unit 2 and is transmitted thereto by way of the brain wave interface unit 3, and then temporarily stores the brain wave pattern therein. The operation-description-vs.-brain-wave-pattern storing unit ( i.e., a first storing means) 82 is provided with a learning function, and pre-stores a plurality of brain wave patterns while associating them with the descriptions (referred to as operation descriptions from here on) of a plurality of operations, respectively, each of which is to be performed on a unit included in the vehicle-mounted apparatus 9, by carrying out brain wave registration processing. The comparison processing unit (i.e., a brain wave pattern comparing means) 83 compares the brain wave pattern temporarily stored in the brain wave pattern storing unit 81 with the plurality of brain wave patterns stored in the operation-description-vs.-brain-wave-pattern storing unit 82 so as to determine whether or not there is a match between the brain wave pattern temporarily stored in the brain wave pattern storing unit 81 with one of the plurality of brain wave patterns stored in the operation-description-vs.-brain-wave-pattern storing unit 82.

Figure 3:
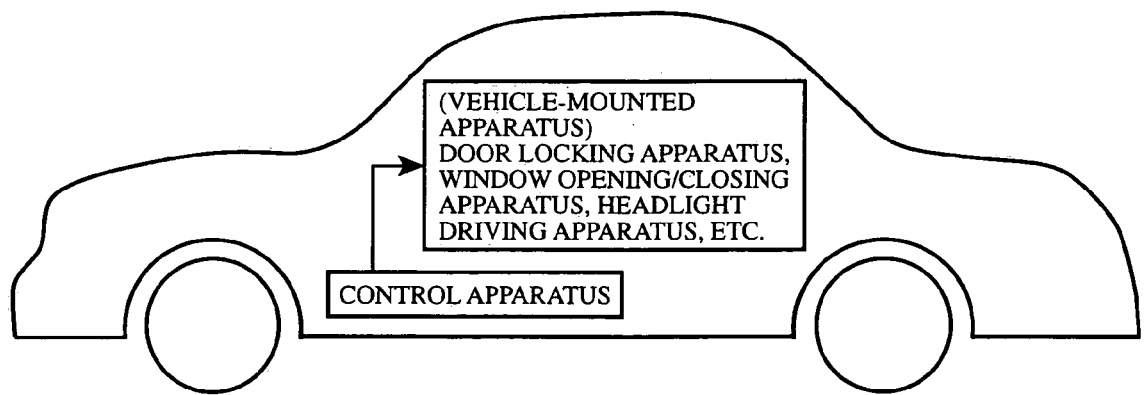
FIG. 3 is a conceptual diagram showing a relationship between the control apparatus and a vehicle-mounted apparatus in accordance with embodiment 1 of the present invention.

FIG. 3 is a conceptual diagram showing a relationship between the control apparatus in accordance with this embodiment 1 and the vehicle-mounted apparatus that is a target apparatus to be controlled. The vehicle-mounted apparatus can include a door locking apparatus, a window opening/closing apparatus, a headlight driving apparatus, and so on. As will be explained in more detail, the control apparatus delivers a control signal for instructing the vehicle-mounted apparatus to carry out a certain operation associated with a brain wave signal obtained from the driver's brain wave to the vehicle-mounted apparatus. A plurality of control signals to be delivered to the vehicle-mounted apparatus can be so determined that they vary from vehicle to vehicle. To this end, the data storage unit 5 can consist of a nonvolatile memory such as a ROM. On the other hand, because the plurality of stored brain wave patterns vary from user to user, the operation-description-vs.-brain-wave-pattern storing unit 82 can consist of a rewritable memory such as a RAM.

Figure 4:
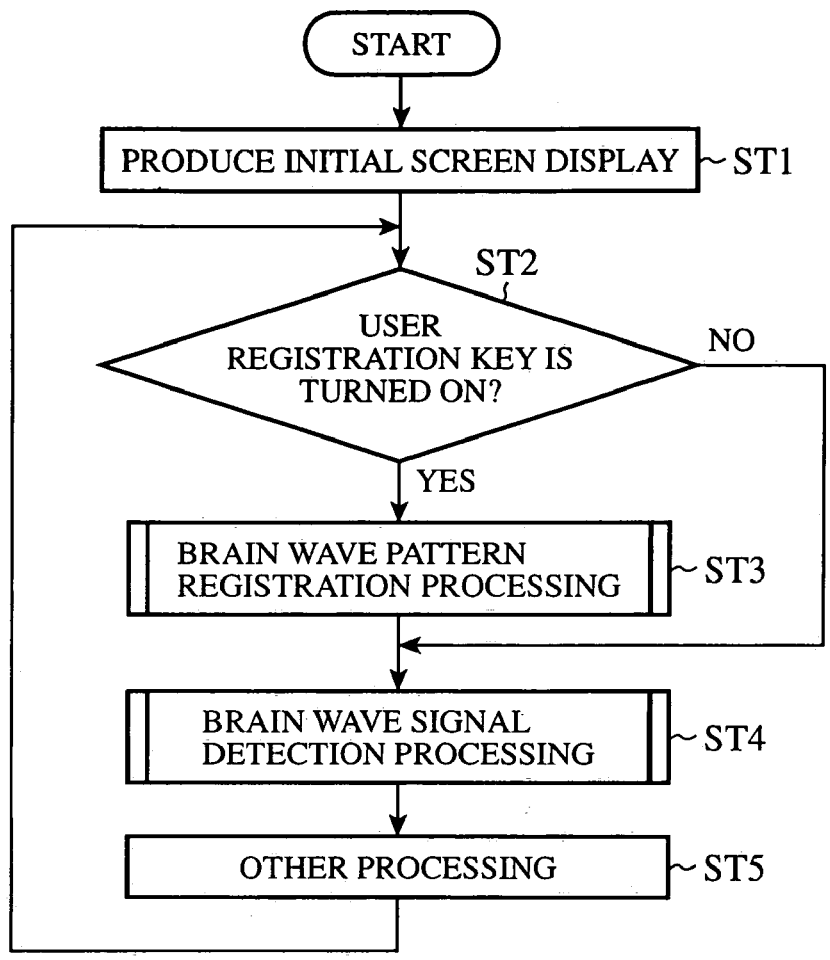
FIG. 4 is a flow chart showing a main flow of processes performed by an arithmetic unit of the control apparatus in accordance with embodiment 1 of the present invention.

Next, a description will be made as to an operation of the control apparatus in accordance with this embodiment 1. FIG. 4 is a chart showing a main flow of processes carried out by the arithmetic unit 6. The arithmetic unit 6 produces an initial screen display (in step ST1), and, after that, repeats loop processing of steps ST2 to ST5. In the loop processing, the arithmetic unit 6 determines whether or not a user registration key on the key input unit 1 is turned on (in step ST2). When this user registration key is turned on, the arithmetic unit 6 carried out brain wave registration processing (in step ST3). In contrast, when the user registration key is not turned on or when the brain wave registration processing is completed, the arithmetic unit 6 carries out brain wave signal detection processing (in step ST4) and other processing (in step ST5), and then returns to step ST2.

FIG. 5 is a flowchart showing the brain wave registration processing of step ST3 in the main flow of FIG. 4. In this flow, the arithmetic unit 6 produces a screen display in which the user is allowed to input the user's ID (i.e., identification data) that identifies him or her uniquely (in step ST101), and then determines whether or not the user ID has been input via the key input unit 1 (in step ST102). When a user ID has been input via the key input unit 1, the arithmetic unit 6 provides a storing area associated with the user ID in the operation-description-vs.-brain-wave-pattern storing unit 82 (in step ST103). The arithmetic unit 6 then sets both a first pointer i for specifying one of the plurality of descriptions of operations, each of which is to be performed on the vehicle-mounted apparatus 9, and a second pointer n for indicating the number of times which the user has performed a key input operation to "1" (in step ST104), and carries out processes of steps ST105 to ST112 while incrementing the first and second pointers i and n.

Figure 6A:
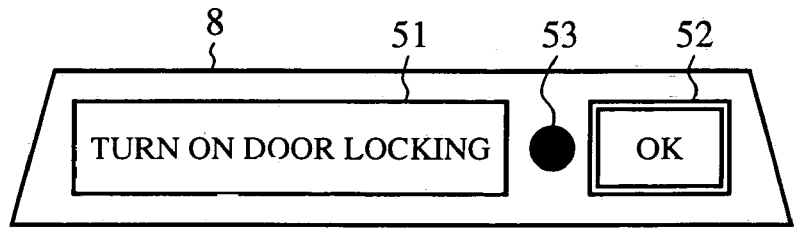
FIGS. 6A to 6C are diagrams each showing an example of a screen display showing an operation description, which is produced in brain wave registration processing of FIG. 5.
Figure 6B:
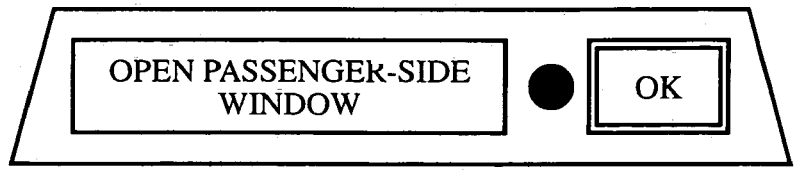
Figure 6C:
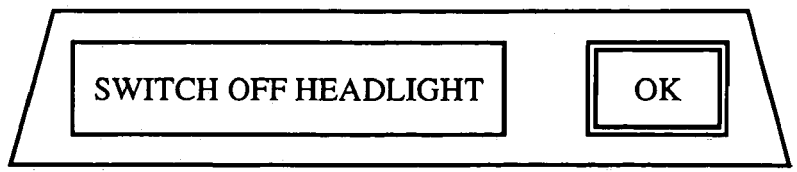

In step ST105, the arithmetic unit 6 produces a screen display showing the name of an operation description (i) specified by the first pointer i. FIGS. 6A to 6C are diagrams each showing an example of a screen display on the display unit 8, in which the name 51 of the operation description (i) is displayed when in brain wave pattern registration mode the arithmetic 6 learns about brain wave patterns obtained from a registered user's brain waves and then registers a brain wave pattern associated with the operation description (i) in a storing area associated with the registered user's and included in the operation-description-vs.-brain-wave-pattern storing unit 82. FIG. 6A is a screen display showing the operation description (i) having a name 51: "Turn on door locking", FIG. 6B is a screen display showing the operation description (i) having a name 51: "Open passenger-side window", and FIG. 6C is a screen display showing the operation description (i) having a name 51: "Switch off headlight". The arithmetic unit 6 can further produce other screen displays showing other various operation descriptions not shown. For example, the arithmetic unit 6 can further produce a screen display showing the operation description (i) having a name 51: "Start driving". The arithmetic unit 6 also displays both an "OK" icon 52 which is selected by the user when the user desires to make the vehicle-mounted apparatus 9 carry out a corresponding operation (which is not actually performed in the brain wave pattern registration mode) and an indicator 53 which is lit when a brain wave pattern is stored in a corresponding storing area of the operation-description-vs.-brain-wave-pattern storing unit 82 on the display unit 8, in addition to the name 51 of the operation description (i).

After producing a screen display associated with the operation description (i) in step ST105 of FIG. 5, the arithmetic unit 6 determines whether it has detected a brain wave signal (in step ST106). When the arithmetic unit 6 has detected a brain wave signal, it produces a brain wave pattern from the detected brain wave signal, and further determines whether or not the driver turns on the "OK" key 52. When the driver turns on the "OK" key, the arithmetic unit 6 increments the second pointer n by only "1" (in step ST108). The arithmetic unit 6 then determines whether the second pointer n exceeds a predetermined value (e.g., 3, 4, or 5) (in step ST109). When the second pointer n is equal to or less than the predetermined value, the arithmetic unit 6 repeats the processes of steps ST106 to ST109. In contrast, when the second pointer n exceeds the predetermined value, that is, when the user has carried out the key input operation indicating that the brain wave pattern acquired in step 106 corresponds to the operation description (i) displayed in step 105 a predetermined number of times, the arithmetic unit 6 stores a brain wave pattern, which is acquired from the n detected, learned-about brain wave patterns, in a storing area associated with the user ID and included in the operation-description-vs.-brain-wave-pattern storing unit 82 while associating the brain wave pattern with the operation description (i) (in step ST110). At this time, the arithmetic unit 6 also makes the indicator 53 light up.

The arithmetic unit 6 can average the n detected, learned-about brain wave patterns which the arithmetic unit 7 acquires by repeating step ST106 the predetermined number of times and store the average of the n detected, learned-about brain wave patterns in the corresponding storing area of the operation-description-vs.-brain-wave-pattern storing unit 82. As an alternative, the arithmetic unit 6 can acquire a waveform pattern including parts whose absolute levels exceed a threshold level from either one of the n detected, learned-about brain wave patterns, and store the acquired waveform pattern in the corresponding storing area of the operation-description-vs.-brain-wave-pattern storing unit 82. Alternatively, after calculating the average of the n detected, learned-about brain wave patterns, the arithmetic unit 6 can acquire a waveform pattern including parts whose absolute levels exceed a threshold level from the average. The method of determining a brain wave pattern, which is to be stored in the corresponding storing area of the operation-description-vs.-brain-wave-pattern storing unit 82, from the n detected, learned-about brain wave patterns while associating the brain wave pattern with the operation description (i) is not limited to any one of the above-mentioned methods.

The arithmetic unit 6 then increments the first pointer i by only "1" (in step ST111), and determines whether the first pointer i exceeds its maximum value (in step ST112). In other words, the arithmetic unit 6 determines whether it has completed the storing process of storing a brain wave pattern for each of all the descriptions of operations, each of which is to be performed to the vehicle-mounted apparatus. When the first pointer i is equal to or less than the maximum value and there is one or more operation descriptions to be associated with brain wave patterns which have not been stored yet in the corresponding storing area of the operation-description-vs.-brain-wave-pattern storing unit 82, the arithmetic unit 6 shifts to step ST105 in which it produces a screen display showing the name of the next operation description. At this time, the arithmetic unit 6 turns off the indicator 53 being lit, and then repeats the above-mentioned processes up to step ST112. In contrast, when the first pointer i exceeds the maximum value, the arithmetic unit 6 finishes this flow of FIG. 5 and returns to the main flow of FIG. 4.

Figure 7:
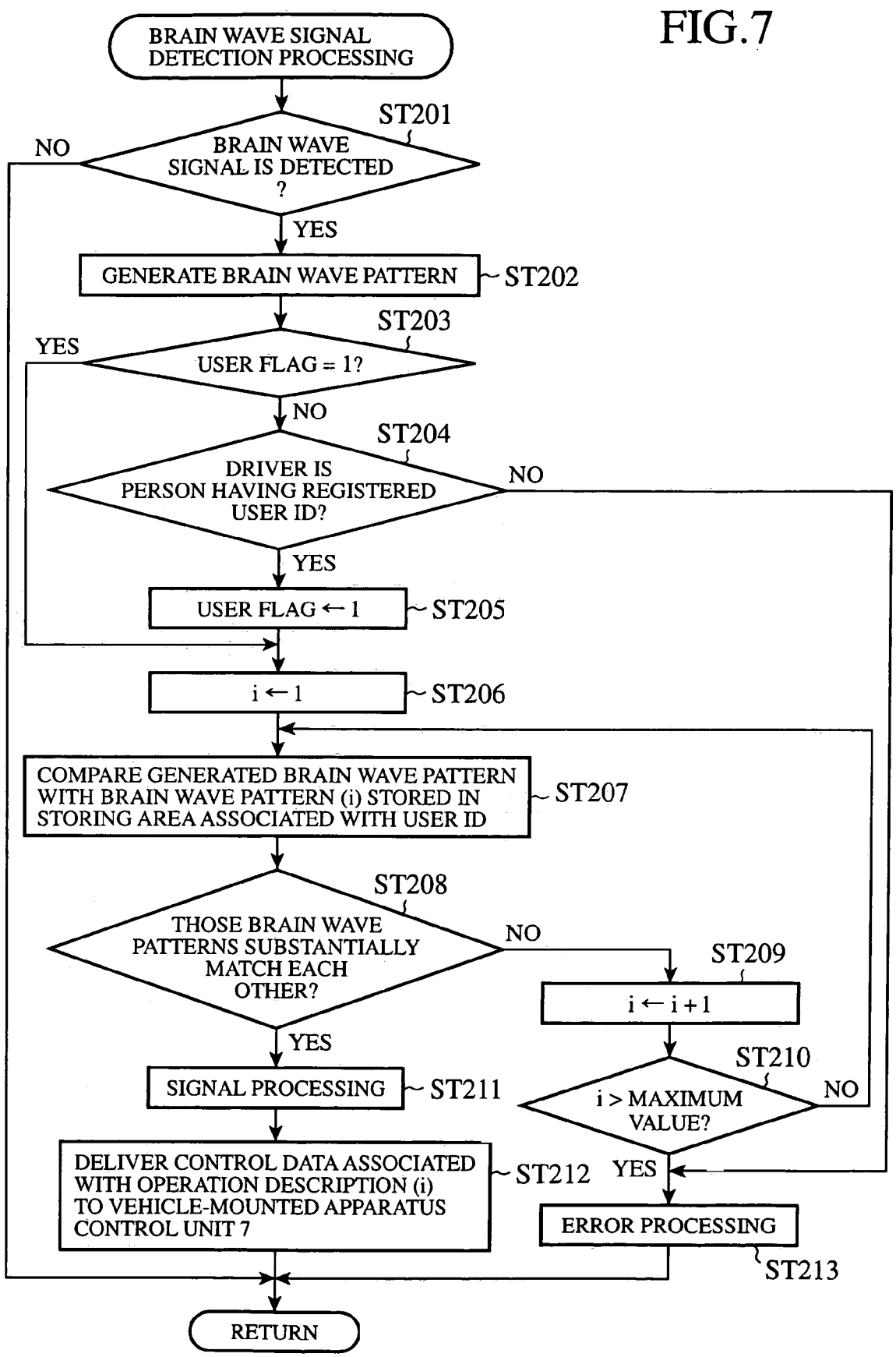
FIG. 7 is a flow chart of brain wave signal detection processing of step ST4 shown in FIG. 4.

FIG. 7 is a flow chart showing the brain wave detection processing of step ST4 in the main flow. The arithmetic unit 6 determines whether or not it has detected a brain wave signal (in step ST201). When the arithmetic unit 6 has detected a brain wave signal, it produces a brain wave pattern based on the detected brain wave signal and temporarily stores it in the brain-wave pattern storing unit 81 (in step ST202). The arithmetic unit 6 then determines whether or not a user flag is set to "1" (in step ST203). When recognizing that a registered user is driving the vehicle, the arithmetic unit 6 sets the user flag to "1" in advance. In contrast, when not recognizing that a registered user is driving the vehicle, the user flag remains at "0".

The arithmetic unit 6 determines whether or not the driver is a person having a registered user ID when the user flag is set to "0" (in step ST204). For example, when a user ID has already been input via the key input unit 1, or when automatically detecting a brain wave pattern indicating "Start driving" from the driver's head, the arithmetic unit 6 can determine that the driver is a person having a registered user ID. When recognizing that the driver is a person having a registered user ID, the arithmetic unit 6 sets the user flag to "1" (in step ST205). After setting the user flag to "1", the arithmetic unit 6 doesn't carry out determination processing of determining whether or not the driver is a person having a registered user ID (in steps ST204 and ST205) even when entering this flow again.

The arithmetic unit 6 then sets the first pointer i specifying one of the plurality of operation descriptions stored in the operation-description-vs.-brain-wave-pattern storing unit 82 to "1" (in step ST206). After that, the arithmetic unit 6 searches through a corresponding storing area of the operation-description-vs.-brain-wave-pattern storing unit 82 for a brain wave pattern that substantially matches the brain wave pattern produced from the detected brain wave signal while incrementing the pointer i. In other words, the arithmetic unit 6, in step ST207, compares the generated brain wave pattern with the ith brain wave pattern (i) stored in the corresponding storing area of the operation-description-vs.-brain-wave-pattern storing unit 82 so as to determine whether the generated brain wave pattern substantially matches the ith brain-wave pattern (i) (in step ST208). When the generated brain wave, pattern does not substantially match the ith brain wave pattern (i) stored in the corresponding storing area of the operation-description-vs.-brain-wave-pattern storing unit 82, the arithmetic unit 6 increments the pointer i by only "1" (in step ST209). The arithmetic unit 6 then determines whether the pointer i exceeds its maximum value (in step ST210). When the pointer i is equal to or less than the maximum value, the arithmetic unit 6 shifts to step ST207 in which it compares the generated brain wave pattern with the next brain wave pattern (i). In contrast, when the generated brain wave pattern substantially matches the ith brain wave pattern (i) stored in the corresponding storing area of the operation-description-vs.-brain-wave-pattern storing unit 82 in step ST208, the arithmetic unit 6 carries out signal processing based on the operation description (i) associated with the ith brain wave pattern (in step ST211).

The description will be directed to this signal processing with reference to FIG. 2. When receiving a determination result indicating that the generated brain wave pattern substantially matches the ith brain wave pattern (i) stored in the corresponding storing area of the operation-description-vs.-brain-wave-pattern storing unit 82 from the comparison processing determination unit 83, the signal processing unit 42 reads the operation description (i) associated with the brain wave pattern (i) from the corresponding storing area of the operation-description-vs.-brain-wave-pattern storing unit 82 and outputs it to the comparison/determination unit 43. The comparison/determination unit 43 compares the operation description (i) delivered thereto with a plurality of types of control data stored in the data storage unit 5, and reads and delivers control data corresponding to the operation description (i) to the signal processing unit 42. The signal processing unit 42 converts the control data into an equivalent control signal through the vehicle-mounted apparatus control unit 7, and then delivers the control signal to the vehicle-mounted apparatus 9.

When determining that the driver is not a person having a registered user ID, in step ST204 of FIG. 7, the arithmetic unit 6 carries out error processing (in step ST213). In this case, the driver has to control the vehicle-mounted apparatus 9 by carrying out a manual operation. When the pointer i exceeds the maximum value in step ST210, no brain wave pattern that substantially matches the generated brain wave pattern is stored in the corresponding storing area of the operation-description-vs.-brain wave-pattern storing unit 82. For example, when the user thinks about an operation of an apparatus that is not included in the vehicle-mounted apparatus 9, because no brain wave pattern that substantially matches the generated brain wave pattern is stored in the corresponding storing area of the operation-description-vs.-brain wave-pattern storing unit 82 even though the brain wave detecting unit 2 detects a brain wave signal, the arithmetic unit 6 carries out the error processing (in step. ST213). After delivering the control signal to the vehicle-mounted apparatus in step ST212, or after carrying out the error processing in step ST213, the arithmetic unit 6 returns to the main flow.

As mentioned above, in accordance with this embodiment 1, the control apparatus is provided with the control processing unit 4 for pre-storing the descriptions of a plurality of operations, each of which is to be performed on a vehicle-mounted apparatus 9 to be controlled, and a plurality of brain wave patterns being respectively associated with the plurality of operation descriptions, and for also pre-storing a plurality of control data each of which is used to produce a control signal that causes the vehicle-mounted apparatus 9 to carry out an operation specified by a corresponding operation description stored therein, and the arithmetic unit 6 for generating a brain wave pattern based on a brain wave signal obtained from a driver's head, for comparing the generated brain wave pattern with the plurality of brain wave patterns pre-stored in the control processing unit 4, when there is a match between the generated brain wave pattern and one of the plurality of brain wave patterns pre-stored in the control processing unit 4, for identifying an operation description associated with the one of the plurality of brain wave patterns pre-stored in the control processing unit 4, and for reading corresponding control data so as to generate and deliver a corresponding control signal that causes the vehicle-mounted apparatus 9 to carry out an operation specified by the associated operation description to the vehicle-mounted apparatus based on the control data. Therefore, the control apparatus can control the vehicle-mounted apparatus 9 by using a brain wave signal.

The target to be controlled by the control apparatus in accordance with the present invention is not limited to a vehicle-mounted apparatus including a door locking apparatus, a window opening/closing apparatus, and a headlight driving apparatus. The control apparatus in accordance with the present invention can control any other various objects to be controlled by using a brain wave signal.

Embodiment 2.

Figure 8:
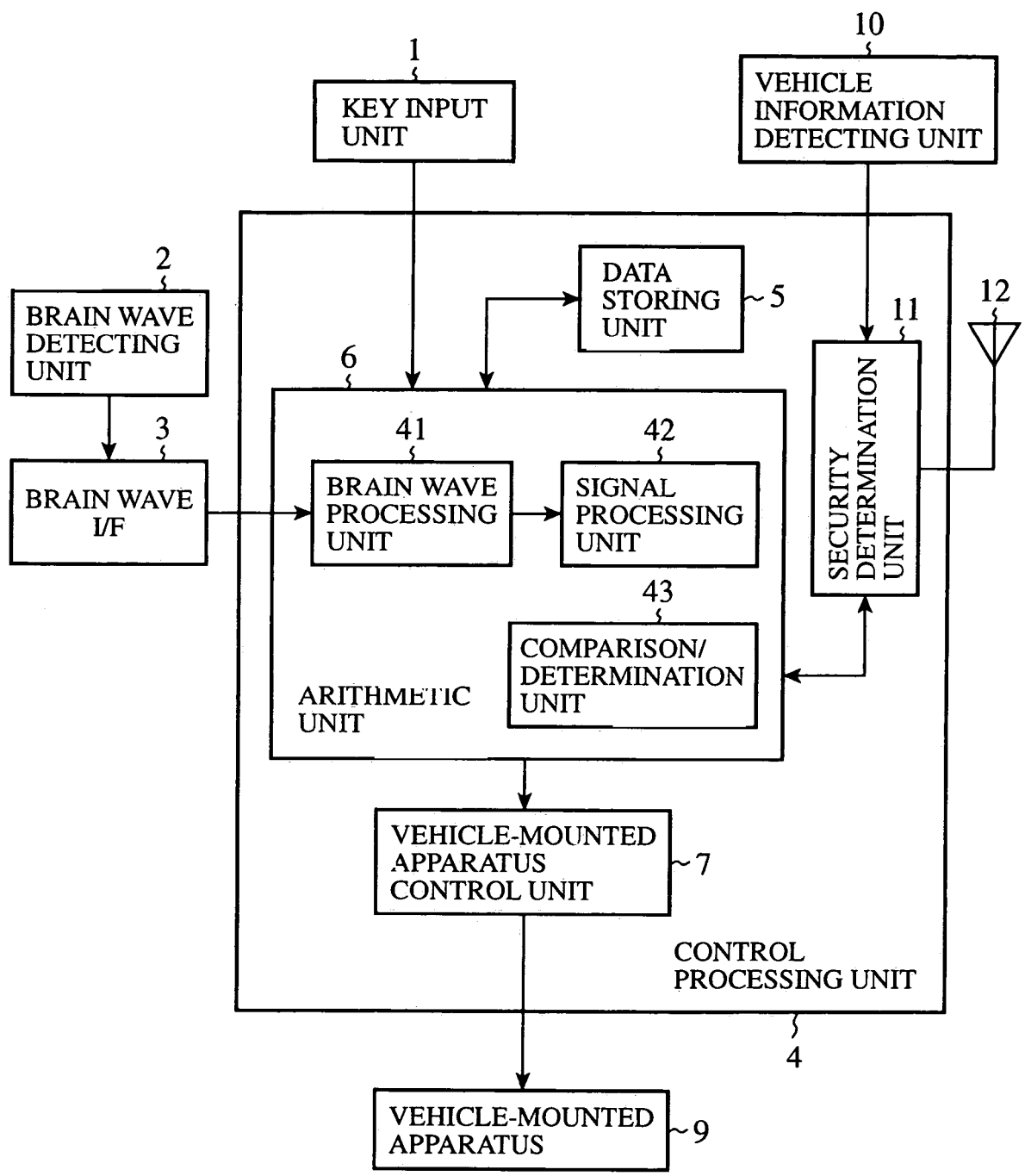
FIG. 8 is a block diagram showing the system configuration of a control apparatus using a brain wave signal in accordance with embodiment 2 of the present invention.
Figure 9:
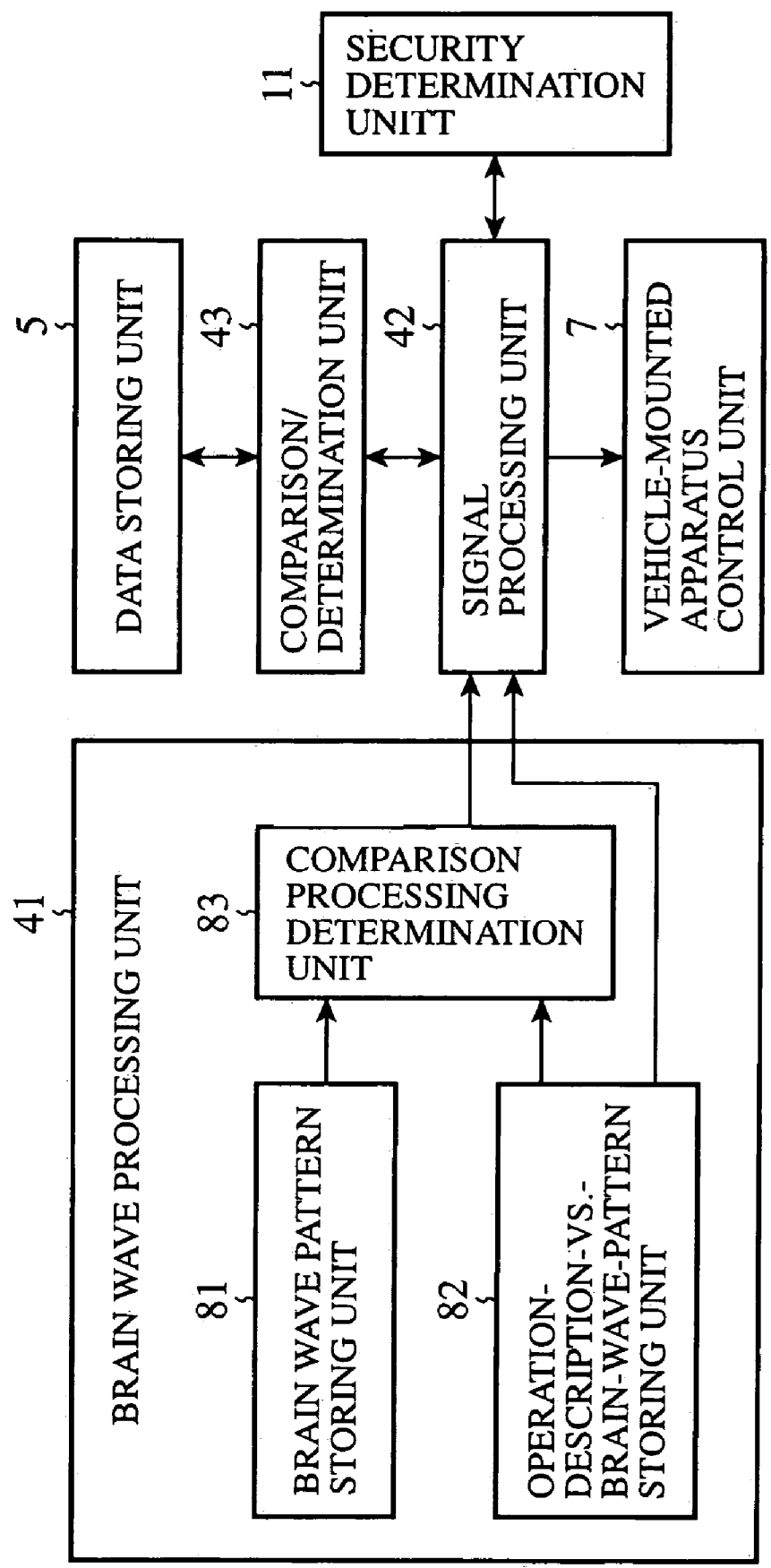
FIG. 9 is a block diagram showing the internal structure of a brain wave processing unit of the control apparatus in accordance with embodiment 2 of the present invention.

FIG. 8 is a block diagram showing the system configuration of a control apparatus using a brain wave signal in accordance with embodiment 2 of the present invention. In the figure, the same components as those of embodiment 1 as shown in FIG. 1 or like components are designated by the same reference numerals, and therefore a repeated explanation of those components will be omitted hereafter. In FIG. 8, a vehicle information detecting unit 10 (i.e., a moving object information detecting means) detects information about a vehicle, such as an engine start, and the current position, bearing, and velocity of a vehicle, from an engine ON detection sensor, a GPS receiver, a gyro, a velocity sensor, and so on. A security determination unit 11(i.e., a security determination means) determines whether a theft of the vehicle has occurred, and generates an electric wave showing a notification that a theft of the vehicle has occurred, and an antenna 12 radiates the electric wave showing a notification that a theft of the vehicle has occurred and generated by the security determination unit 11. FIG. 9 is a block diagram showing a relationship between the internal structure of a brain wave processing unit 41 and a signal processing unit 42, a comparison/determination unit 43, a data storage unit 5, a vehicle-mounted apparatus control unit 7, and the security determination unit 11.

Next, a description will be made as to an operation of the control apparatus using brain wave signals in accordance with embodiment 2 of the present invention. In this embodiment 2, a main flow of, processes carried out by an arithmetic unit 6 and brain wave registration processing included in the main flow of processes are the same as the main flow of above-mentioned embodiment 1 as shown in FIG. 4 and the brain wave registration processing as shown in FIG. 5, respectively. In addition, brain wave signal detection processing of embodiment 2 included in the main flow partially differs from the brain wave signal detection processing of above-mentioned embodiment 1. Therefore, a repeated explanation of the operation of the control apparatus of embodiment 2, which is already done in embodiment 1, will be omitted hereafter.

Figure 10:
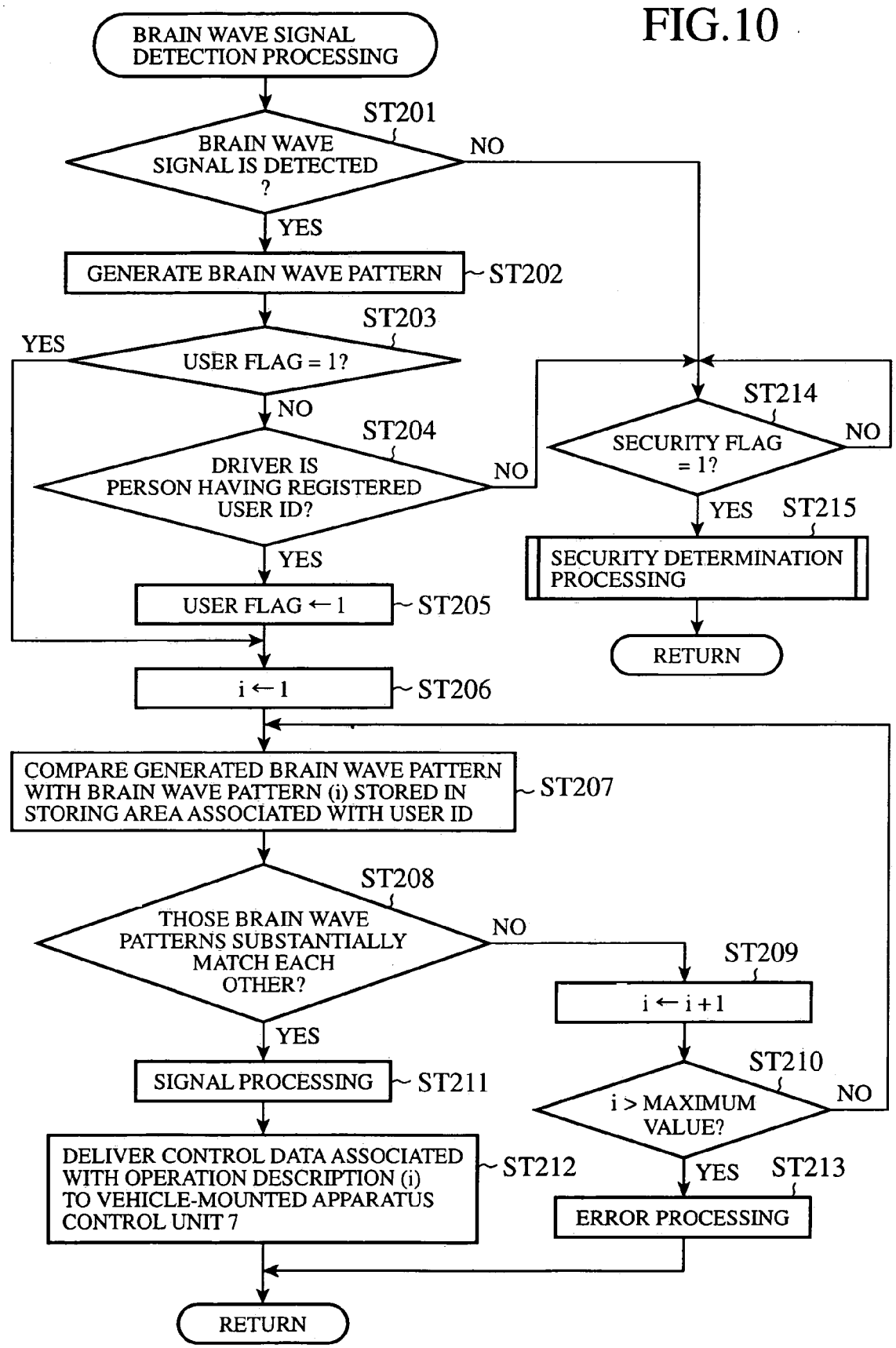
FIG. 10 is a flow chart showing brain wave signal detection processing in accordance with embodiment 2 of the present invention.

FIG. 10 is a flow chart showing the brain wave signal detection processing of embodiment 2. In this flow, processes of steps ST201 to ST213 are the same as those of above-mentioned embodiment 1 as shown in FIG. 7. When a brain wave detecting unit 2 detects no brain wave signal in step ST201, or when the arithmetic unit 6 does not recognize any registered user ID in step ST204, the arithmetic unit 6 advances to step ST214 in which it determines whether or not a security flag is set to "1", and then, in step ST215, carries out security determination processing when the security flag is set to "1", unlike that of above-mentioned embodiment 1.

The driver is allowed to set the security flag to "1" by selecting a predetermined icon on a screen display on a display unit not shown in the figure when he or she stops and leaves the vehicle, for example. As an alternative, the arithmetic unit 6 can automatically set the security flag to "1" when the engine of the vehicle is stopped. The driver can reset the security flag to "0" by selecting a predetermined icon on a screen display on the display unit not shown in the figure when he or she starts driving the vehicle. As an alternative, the arithmetic unit 6 can automatically reset the security flag to "0" when recognizing that the driver is a person having a registered user ID and then setting a user flag to "1".

FIG. 11 is a flow chart showing the security determination processing of step ST215 in the flow of FIG. 10. The security determination unit 11 determines whether or not the user flag is set to "0" according to information from the signal processing unit 42 (in step ST301). When the user flag is set to "1", because a registered user is driving the vehicle, the arithmetic unit 6 determines that no security trouble has occurred and finishes this flow. In contrast, when the user flag is set to "0", the security determination unit 11 determines whether a predetermined time has elapsed since the start of this security determination processing (in step ST302).

When determining that the predetermined time (e.g., a few minutes to several tens of minutes) has elapsed since the start of this security determination processing, the security determination unit 11 acquires data about the current position of the vehicle which a vehicle information detecting unit 10 has obtained from a GPS signal (in step ST303), and then determines whether or not there is a change between a previous position of the vehicle and the obtained current position of the vehicle (in step ST304). When determining that there is no change between the previous position of the vehicle and the obtained current position of the vehicle, the security determination unit 11 determines that the vehicle is not stolen and finishes this flow. In contrast, when there is a change between the previous position of the vehicle and the obtained current position of the vehicle, the security determination unit 11 determines that the vehicle has been stolen and sends an electric wave indicating a notification that the vehicle has been stolen to a predetermined management center (in step ST305). When the predetermined time period has not elapsed yet in step ST302, the security determination unit 11 determines whether or not the engine has been started (in step ST306) by using the vehicle information detecting unit 10. When determining that the engine has been started, the security determination unit 11 determines that a theft of the vehicle has occurred and sends out notification information indicating a notification that a theft of the vehicle has occurred (in step ST305). In contrast, when determining that the engine has not been started, the security determination unit 11 determines that no theft has occurred and finishes this flow. Instead of determining whether or not the engine has been started, the security determination unit 11 can be so constructed as to determine whether or not the vehicle has been moved by using information from a vehicle velocity sensor.

As mentioned above, in accordance with this embodiment 2, when there is a change between the previous position of the vehicle and the obtained current position of the vehicle while the brain wave detecting unit does not detect any brain wave signal, the security determination unit 11 determines that a theft of the vehicle has occurred (i.e., the vehicle has been stolen) and sends out an electric wave indicating a notification that the vehicle has been stolen to a predetermined management center. Thus, the control apparatus can implement a security function of automatically notifying a theft of the vehicle to users by using a brain wave signal. In a variant of this embodiment 2, the control apparatus is so constructed as to transmit an electric wave indicating a notification that the vehicle has been stolen to a registered user's communication terminal instead of a predetermined management center. As an alternative, the control apparatus can transmit an electric wave indicating a notification that the vehicle has been stolen to a registered user's communication terminal as well as to a predetermined management center. In addition, the control apparatus can be so constructed as to send out notification information indicating a notification that the vehicle has been stolen and including current position information about the current position of the vehicle. In this case, the predetermined management center or the like can keep track of the vehicle even after the vehicle has been stolen. In a further variant of this embodiment 2, the control apparatus can be so constructed as to check to see whether or not the security of a moving object, such as a ship, other than a vehicle, is maintained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A control apparatus using a brain wave signal, said apparatus comprising:
    a first storing unit for pre-storing operation descriptions, which are descriptions of a plurality of types of operations to be performed on an apparatus to be controlled, and a plurality of brain wave patterns being respectively associated with the operation descriptions;
    a second storing unit for pre-storing a plurality of control data each of which is used for causing an apparatus to be controlled to carry out an operation specified by a corresponding operation description stored in said first storing unit;
    a brain wave detecting unit for detecting a brain wave signal from a user's head;
    a brain wave pattern generating unit for generating a brain wave pattern based on the brain wave signal detected by said brain wave detecting unit;
    a brain wave pattern comparison unit for comparing the brain wave pattern generated by said brain wave pattern generating unit with the plurality of brain wave patterns stored in said first storing unit, and for, when there exists a brain wave pattern substantially matching the generated brain wave pattern in said first storing unit, identifying an operation description associated with this brain wave pattern substantially matching the generated brain wave pattern; and
    a signal processing unit for reading control data corresponding to said identified operation description from said second storing unit so as to generate a control signal causing an apparatus to be controlled to carry out an operation specified by said identified operation description;
    wherein said apparatus further comprises:
    a moving object information detecting unit for detecting a change of a status of a moving object; and
    a security determination unit for sending out an electric wave indicating a notification that said moving object has been stolen when said moving object information detecting unit detects a change of the status of said moving object while said brain wave detecting unit does not detect any brain wave.

2. The control apparatus using brain wave signals according to claim 1, wherein said moving object information detecting unit is a position detecting unit for detecting a current position of said moving object, and, when detecting a change of the current position of said moving object by using said position detecting unit while said brain wave detecting unit does not detect any brain wave, said security determination unit sends out an electric wave indicating a notification that said moving object has been stolen.

3. The control apparatus using brain wave signals according to claim 1, wherein said moving object information detecting unit is an engine start detecting unit for detecting a start of an engine of said moving object, and, when detecting a start of the engine of said moving object by using said engine start detecting unit while said brain wave detecting unit does not detect any brain wave, said security determination unit sends out an electric wave indicating a notification that said moving object has been stolen.

4. The control apparatus using brain wave signals according to claim 1, wherein said moving object information detecting unit is a velocity detecting unit for detecting a velocity of said moving object, and, when detecting a movement of said moving object by using said velocity detecting unit while said brain wave detecting unit does not detect any brain wave, said security determination unit sends out an electric wave indicating a notification that said moving object has been stolen.

5. The control apparatus using brain wave signals according to claim 1, wherein said security determination unit transmits an electric wave indicating a notification that said moving object has been stolen to a predetermined management center.

6. The control apparatus using brain wave signals according to claim 1, wherein said security determination unit transmits an electric wave indicating a notification that said moving object has been stolen to a predetermined communication terminal.

7. The control apparatus using brain wave signals according to claim 6, wherein said predetermined communication terminal is a communication terminal owned by a user associated with identification data preset by said security determination unit.

8. The control apparatus using brain wave signals according to claim 1, wherein the electric wave sent out by said security determination unit includes current position information indicating a current position of said moving object.

9. A control apparatus using a brain wave signal, said apparatus comprising:
    a first storing unit for pre-storing operation descriptions, which are descriptions of a plurality of types of operations to be performed on an apparatus to be controlled, and a plurality of brain wave patterns being respectively associated with the operation descriptions;
    a second storing unit for pre-storing a plurality of control data each of which is used for causing an apparatus to be controlled to carry out an operation specified by a corresponding operation description stored in said first storing unit;
    a brain wave detecting unit for detecting a brain wave signal from a user's head;
    a brain wave pattern generating unit for generating a brain wave pattern based on the brain wave signal detected by said brain wave detecting unit;
    a brain wave pattern comparison unit for comparing the brain wave pattern generated by said brain wave pattern generating unit with the plurality of brain wave patterns stored in said first storing unit, and for, when there exists a brain wave pattern substantially matching the generated brain wave pattern in said first storing unit, identifying an operation description associated with this brain wave pattern substantially matching the generated brain wave pattern; and a signal processing unit for reading control data corresponding to said identified operation description from said second storing unit so as to generate a control signal causing an apparatus to be controlled to carry out an operation specified by said identified operation description;

wherein when receiving an instruction for associating a brain wave pattern generated by said brain wave pattern generating unit with an operation description displayed on a display unit, the operation description specifying an operation to be performed on an apparatus to be controlled, said first storing unit stores the generated brain wave pattern therein while associating it with the operation description; and wherein said first storing unit has a plurality of storing areas in each of which a plurality of brain wave patterns respectively associated with a plurality of operation descriptions are stored, the plurality of storing areas being associated with a plurality of users, respectively, and said brain wave pattern comparison unit compares the brain wave pattern generated by said brain wave pattern generating unit with the plurality of brain wave patterns stored in a storing area of said first storing unit, said storing area being specified by input identification data that identifies a corresponding user.

* * * * *